United States Patent
Lobisser et al.

(10) Patent No.: US 12,252,281 B2
(45) Date of Patent: Mar. 18, 2025

(54) MEASUREMENT AND CONTROL OF RESPIRATION OF PERISHABLE COMMODITIES IN LOW ABSOLUTE PRESSURE METHOD, SYSTEM, AND APPARATUS

(71) Applicant: RIPELOCKER, LLC, Bainbridge Island, WA (US)

(72) Inventors: George Frank Lobisser, Bainbridge Island, WA (US); Ricardo I. Diaz-Carcamo, Wenatchee, WA (US); Andrew B. Harrah, Bainbridge Island, WA (US); Yong-Ki Kim, Yakima, WA (US); Eric Levi, Bainbridge Island, WA (US); Alexander Keith Tellekson, Kingston, WA (US)

(73) Assignee: RIPELOCKER, LLC

( * ) Notice: Subject to any disclaimer, the term of this patent is extended or adjusted under 35 U.S.C. 154(b) by 934 days.

(21) Appl. No.: 17/360,892

(22) Filed: Jun. 28, 2021

(65) Prior Publication Data

US 2021/0323705 A1    Oct. 21, 2021

Related U.S. Application Data

(63) Continuation-in-part of application No. 17/176,063, filed on Feb. 15, 2021, now Pat. No. 12,168,537, which is a continuation of application No. 15/923,529, filed on Mar. 16, 2018, now Pat. No. 10,919,656, and a continuation of application No. 15/923,611, filed on Mar. 16, 2018, now Pat. No. 11,008,151.

(60) Provisional application No. 62/472,284, filed on Mar. 16, 2017, provisional application No. 62/472,316, filed on Mar. 16, 2017.

(51) Int. Cl.
B65B 31/02   (2006.01)
B65B 25/00   (2006.01)
B65D 81/20   (2006.01)
B65D 85/34   (2006.01)

(52) U.S. Cl.
CPC .......... B65B 31/025 (2013.01); B65B 25/001 (2013.01); B65D 81/2038 (2013.01); B65D 85/34 (2013.01)

(58) Field of Classification Search
CPC .... A23B 7/152; B65D 81/2038; B65D 85/34; B65B 31/025; B65B 25/001; B65B 25/041
USPC .............................................. 53/432; 99/472
See application file for complete search history.

(56) References Cited

U.S. PATENT DOCUMENTS 2,890,810 A   6/1959  Gisela
3,085,913 A   4/1963  Caswell
3,418,783 A   12/1968 Collons
(Continued)

OTHER PUBLICATIONS

Stanley P. Burg, Postharvest Psysiology Hypobaric Storage Fresh Produce, CABI Publishing, Oxfordshire, UK, ISBN, 0851998011, copyright S.P. Burg 2004.
(Continued)

*Primary Examiner* — Eric S Stapleton
(74) *Attorney, Agent, or Firm* — AEON Law, PLLC; Adam L. K. Philipp; Ki Yong O

(57) ABSTRACT

Methods, apparatus, and system to measure and control respiration of a perishable commodity in a vacuum chamber, including for purposes of extending a shelf life of a perishable commodity therein, including.

20 Claims, 4 Drawing Sheets

(56) References Cited

U.S. PATENT DOCUMENTS

| | | | |
|---|---|---|---|
| 3,419,893 A | 12/1968 | Vahlstrom | |
| 4,113,095 A | 9/1978 | Dietz et al. | |
| 4,591,055 A | 5/1986 | Corn | |
| 4,643,314 A | 2/1987 | Kidd | |
| 5,028,443 A | 7/1991 | Wade | |
| 5,111,938 A | 5/1992 | Soprano et al. | |
| 5,261,976 A | 11/1993 | Schultz | |
| 5,450,998 A | 9/1995 | Esse et al. | |
| 5,487,471 A | 1/1996 | Marchek et al. | |
| 5,498,481 A | 3/1996 | Ooij | |
| 5,623,105 A * | 4/1997 | Liston | A23L 3/3418 426/418 |
| 5,872,721 A * | 2/1999 | Huston | A23B 7/148 702/24 |
| 5,983,830 A | 11/1999 | Cox et al. | |
| 6,305,148 B1 * | 10/2001 | Bowden | B65B 31/047 206/524.8 |
| 6,536,192 B2 | 3/2003 | King et al. | |
| 6,962,654 B2 | 11/2005 | Arnaud | |
| 7,203,574 B2 | 4/2007 | Caci et al. | |
| 8,256,190 B2 * | 9/2012 | Bowden | B65B 55/00 426/316 |
| 8,683,776 B2 * | 4/2014 | Bowden | B65B 11/025 426/316 |
| 8,783,002 B2 * | 7/2014 | Bowden | A23L 3/3418 426/316 |
| 10,759,588 B1 | 9/2020 | Lobisser et al. | |
| 11,484,038 B2 * | 11/2022 | Schaefer | A23L 3/3418 |
| 2002/0085950 A1 | 7/2002 | Robitaille et al. | |
| 2003/0173276 A1 | 9/2003 | Arnaud | |
| 2007/0258855 A1 | 11/2007 | Turcot et al. | |
| 2009/0230012 A1 | 9/2009 | Choy et al. | |
| 2010/0200599 A1 | 8/2010 | Molthen et al. | |
| 2011/0132801 A1 | 6/2011 | Elder | |
| 2011/0247622 A1 | 10/2011 | Schneider et al. | |
| 2013/0000255 A1 * | 1/2013 | Bowden | B65B 55/00 53/432 |
| 2013/0156912 A1 | 6/2013 | Espinosa | |
| 2013/0205717 A1 * | 8/2013 | Bowden | B65B 11/025 53/403 |
| 2015/0108037 A1 | 4/2015 | Evans et al. | |
| 2020/0113199 A1 * | 4/2020 | Schaefer | A23B 7/152 |
| 2020/0385205 A1 * | 12/2020 | Lobisser | A23B 7/152 |
| 2021/0163165 A1 | 6/2021 | Lobisser et al. | |
| 2023/0312151 A1 | 10/2023 | Lobisser et al. | |

OTHER PUBLICATIONS

Dickson et al., "Abatement of Ethylene by Ozone Treatment in Controlled Atmosphere Storage of Fruits and Vegetables", Paper No. 92-6571, presented at the 1992 International Winter Meeting sponsored by the American Society of Agricultural Engineers, 9 pages.

Karaca et al., "Effect of continuous 0.3 µL/L gaseous ozone exposure on fungicide residues on table grape berries", Postharvest Biology and Technology, vol. 64, 2012, pp. 154-159.

* cited by examiner

MEASUREMENT AND CONTROL OF RESPIRATION OF PERISHABLE COMMODITIES IN LOW ABSOLUTE PRESSURE METHOD, SYSTEM, AND APPARATUS

CROSS-REFERENCE TO RELATED APPLICATIONS

This application is a continuation-in-part of U.S. patent application Ser. No. 17/176,063, filed on Feb. 15, 2021; U.S. States patent application Ser. No. 17/176,063 is a continuation of U.S. patent application Ser. No. 15/923,529, filed on Mar. 16, 2018, issued as U.S. Pat. No. 10,919,656 on Feb. 16, 2021; United States patent application number 17/176,063 is a continuation of U.S. patent application Ser. No. 15/923,611, filed on Mar. 16, 2018, issued as U.S. Pat. No. 11,008,151 on May 18, 2021. U.S. patent application Ser. No. 15/923,529 claims priority to U.S. provisional patent application 62/472,284, filed on Mar. 16, 2017. U.S. patent application Ser. No. 15/923,611 claims priority to U.S. provisional patent application 62/472,316, filed on Mar. 16, 2017. Through U.S. patent application Ser. No. 17/176,063, U.S. patent application Ser. No. 15/923,529, and U.S. patent application Ser. No. 15/923,611, this application further claims priority from U.S. provisional patent application 62/472,284, filed on Mar. 16, 2017 and U.S. provisional patent application 62/472,316, filed on Mar. 16, 2017. The subject matter of the foregoing applications is incorporated herein by this reference and the filing dates of the foregoing applications are claimed by this application for purposes of filing priority.

FIELD

The present disclosure relates to methods, apparatuses, and systems to measure and control metabolic activity, respiration, respiratory quotient, and or fermentation in a low pressure vacuum chamber, including for purposes of extending a shelf life of a perishable commodity therein.

BACKGROUND

A problem that has existed since the dawn of agriculture is that, while human demand for fruits and vegetables exists year-round, the growing season does not or the seasons in the two hemispheres are inverted, requiring transportation of produce to meet out-of-season demand. Many perishable commodities, such as fruits, vegetables, flowers, meat and fish can only be grown, ripened, and or harvested during specific, typically short, times of the year. Furthermore, such commodities are often grown far from the markets in which they are sold and consumed. Time spent shipping such perishable commodities still further reduces the practical time during which the perishable commodities can be sold and consumed. In the case of certain fruits, such as strawberries, blueberries, etc., time between when the fruit is ripe for harvest and when it begins to spoil is often short. This creates the dual problems of, for example, too much of a perishable being available during the peak of the harvesting season, and too little being available during the off, or non-peak seasons. Due this, some perishable commodities are transported by airplane, rather than by more economical and energy efficient transportation modalities, such as rail and ship. Much effort has, accordingly, been directed toward extending the post-harvest life of fruits, vegetables, flowers, meat, fish, and similar perishable commodities ("perishables") intended for human or animal consumption and or use.

One known technique for extending the post-harvest life of fruits and vegetables involves placing the perishables in a vacuum for storage. It has been determined that holding perishables in a vacuum of between approximately 10 to 150 Torr, potentially in combination with refrigeration, may slow degradation compared to refrigeration alone.

Although theoretical beneficial effects of vacuums on harvested fruit and vegetables are known, many problems exist which prevent use of such techniques in actual practice. Prior attempts have included building specialized refrigerated vacuum units, such as large ISO containers, for storing perishable commodities after harvest and before shipment to retailers and consumers. Such units or containers are large, bulky, immovable, expensive, and attaining and maintaining a desired level of vacuum may not be possible because such units and containers leak a significant amount. For example, such units required continuous operation of a vacuum pump and, even then, were often not able to obtain or continuously maintain low absolute pressure conditions. Still further problems are encountered when the need to keep the perishable commodities hydrated under vacuum conditions is considered, inasmuch as water sublimates or evaporates more readily at low absolute pressure than at atmospheric pressure ("atmospheric pressure" being an absolute pressure of 760 Torr); low absolute pressure may thereby cause desiccation of perishable commodities.

It has not been practical to transport a large unit or ISO container of perishable commodities at low absolute pressure, because, for example, even if the low absolute pressure could be obtained, a vacuum pump would have to accompany the container and would need to operate continuously. Such a vacuum pump would consume a large amount of power, the pressure-resistant unit or container would be expensive and subject to external perturbation, failure of seals, failure of the vacuum pump, and loading and unloading of such a large container would be a complicated and expensive process requiring well trained staff. Even if such a unit or container could be made economically feasible, it would need to be shipped, assembled, and made ready at a site reasonably close to where the perishables are harvested or at least near a point of departure for long-distance travel. Such equipment weighs a great deal and occupies a large space, so is not suitable for air transportation. On arrival at a destination, perishable commodities in such a unit or container would need to be subdivided for different distributors, which would involve breaking the seals on the unit or container. Events on both sides of transit would reduce the time during which the perishable could be kept in low absolute pressure conditions, further undermining a rationale for use of low absolute pressure for long-distance transport of perishable commodities. In addition, if a vacuum container continuously leaks and must be continuously pumped out to maintain a desired level of vacuum, oxygen levels in the container, as a percentage of the low absolute pressure atmosphere in the container, will be the same as the percentage found in the atmosphere which is leaking into the container.

Techniques to control composition of an atmosphere around certain perishable commodities have been and are practiced at (conventional) atmospheric pressure. For example, it is known that ethylene can cause certain perishable commodities, such as apples and bananas, to ripen or can cause other perishable commodities, such as potatoes, to sprout. Certain perishable commodities, such as apples and onions, are known to emit ethylene. Other gases, such as nitrogen and carbon dioxide, are known to slow decomposition of certain perishable commodities.

Apparatuses have been developed to store perishable commodities in controlled gas conditions at or close to atmospheric pressure. Such apparatuses include warehouses with sealed rooms, containers, and pallets, all of which may be coupled to control systems and gas supplies. The sealed environment, gas supply, and control system may be used to control a composition of an atmosphere around perishable commodities by introducing a desired composition of gas into the sealed container. In addition, modified atmosphere packaging bags are used to control gas composition around perishable commodities at atmospheric pressure. Control of the atmosphere may be performed to slow ripening until the commodity is close to being sold, at which time the composition of gas in the container may be altered to speed ripening.

After being harvested, perishables that are not frozen continue to undergo respiration, have an active metabolism, and continue to "live", notwithstanding that they may have been removed from a plant, whether or not placed in a vacuum chamber. Forms of respiration include aerobic respiration and anaerobic respiration. Fermentation may also occur in or with respect to a perishable commodity.

After being harvested, perishables categorized and or sold as "fresh" should typically only undergo aerobic respiration, as anaerobic respiration (or fermentation) may cause changes which many consumers understand as or associate with "rot", "off", spoilage, or other undesirable flavors.

Respiration or metabolism of perishables can be measured as respiratory quotient, or "RQ", which is the ratio of carbon dioxide eliminated (expelled) and oxygen consumed. In general, RQ for a fresh vegetable or fruit is around 1:1 (one molecule of carbon dioxide eliminated for every molecule of oxygen consumed), though it is believed that RQ for different perishable commodities can range from 0.7:1 to 1.3:1. Respiration is known to be directly related to temperature, which relationship may be referred to as "Q10" or temperature coefficient.

Measurement of metabolism inside a plant or measurement of respiration by a plant or measurement of fermentation of a plant generally involves measurement of gases in a sealed container containing the plant. Due to the large volume of gas around a plant in any sealed container relative to the relatively small amount of gas emitted by the plant, such measurements are typically performed over a long period of time, such as over days, and or with respect to a large sample of plants, such as a room filled with plants. Such measurements may not be capable of determining changes in metabolism, respiration, or fermentation for an individual plant and or may not be capable of measuring metabolic or respiratory changes or fermentation on a scale of minutes or hours. Such measurements must extrapolate from the large sample to the metabolic or respiratory behavior of a smaller sample or to the behavior of a component of the plant, which introduces significant uncertainty.

In addition, sensors to measure carbon dioxide and or oxygen have a limited operating range, with the range and sensitivity of the sensor also being impacted by the absolute pressure of the gas being sampled. In addition, sensors to measure carbon dioxide and or oxygen have cross-sensitivity to humidity and other gases. Sensors to measure carbon dioxide and or oxygen may not function properly when at low absolute pressure. In addition, different plants have different baseline metabolic activity in different conditions, such as when in sun, in shade, in the day, at night, when dry, when wet, when receiving nutrients, when not receiving nutrients, when growing, when in senescence, etc. In addition, fruit, grain, or another component of a plant may have a different metabolic activity than the larger plant from which it was harvested. Consequently, many studies of plant metabolism are addressed to a particular plant, or plant component, under a specific condition, with a limited set of sensors selected to have an operating range that is predicted to overlap with the testing conditions of interest. In addition, a perishable commodity from one growing season or in one year may have a different metabolic activity than the same perishable commodity grown in a different growing season or in another year.

In addition, temperature of a perishable commodity has a large effect on metabolic activity. Small changes in temperature, on the order of only a few degree or two (Celsius), can result in significant changes in metabolic activity. Due to the large scale at which perishable commodities are handled, temperature control is often imprecise and effected by factors such as exposure of warehouses to sunlight, heating and air conditioning equipment variations, and the like.

Due to these very real limitations, information regarding metabolic activity or respiration of specific plants under many conditions is generally not available; when available, it may only be known with respect to a few plant species, it may be based on expensive studies carried out over a long period of time, such as on the order of days, under a limited range of conditions, and or with respect to a large number of plants or a large sample size. Such long sampling times (generally, days or longer), produce an average. Such an average may obscure very different metabolic or respiratory activity at night versus at day or at a beginning of a period of time versus at an end of the period of time. Such information may not be available with respect to a perishable commodity, distinct from a plant from which it may have been harvested.

Due to these very real limitations, information regarding actual metabolic activity of a specific sample of a specific perishable commodity, in a specific environment, at the specific temperature of the perishable commodity, is generally not known, particularly not on a minute-by-minute, hour-by-hour, or even day-by-day basis. Even in rare cases when attempts are made to measure metabolic or respiratory activity of a perishable commodity during shipment or storage, it may not be possible to compare the information to an expected or desired metabolic state, because such information may not be available for the plant or plant component in question. If it is possible to compare the information to an expected or desired metabolic state, the comparison may not be relevant or useful, because of differences between the studied plant or the studied perishable commodity and the specific perishable commodity being shipped or stored as well as due to differences in storage conditions.

Needed is an apparatus, system, and or method to measure metabolic or respiratory activity of perishable commodities in a vacuum container at a time scale in which metabolic or respiratory changes can cause damage (e.g. a plurality of times per day) and which can modify metabolic activity, such as to reduce it to a lowest level possible with minimal production of undesirable metabolic products.

DETAILED DESCRIPTION

Figure 1:
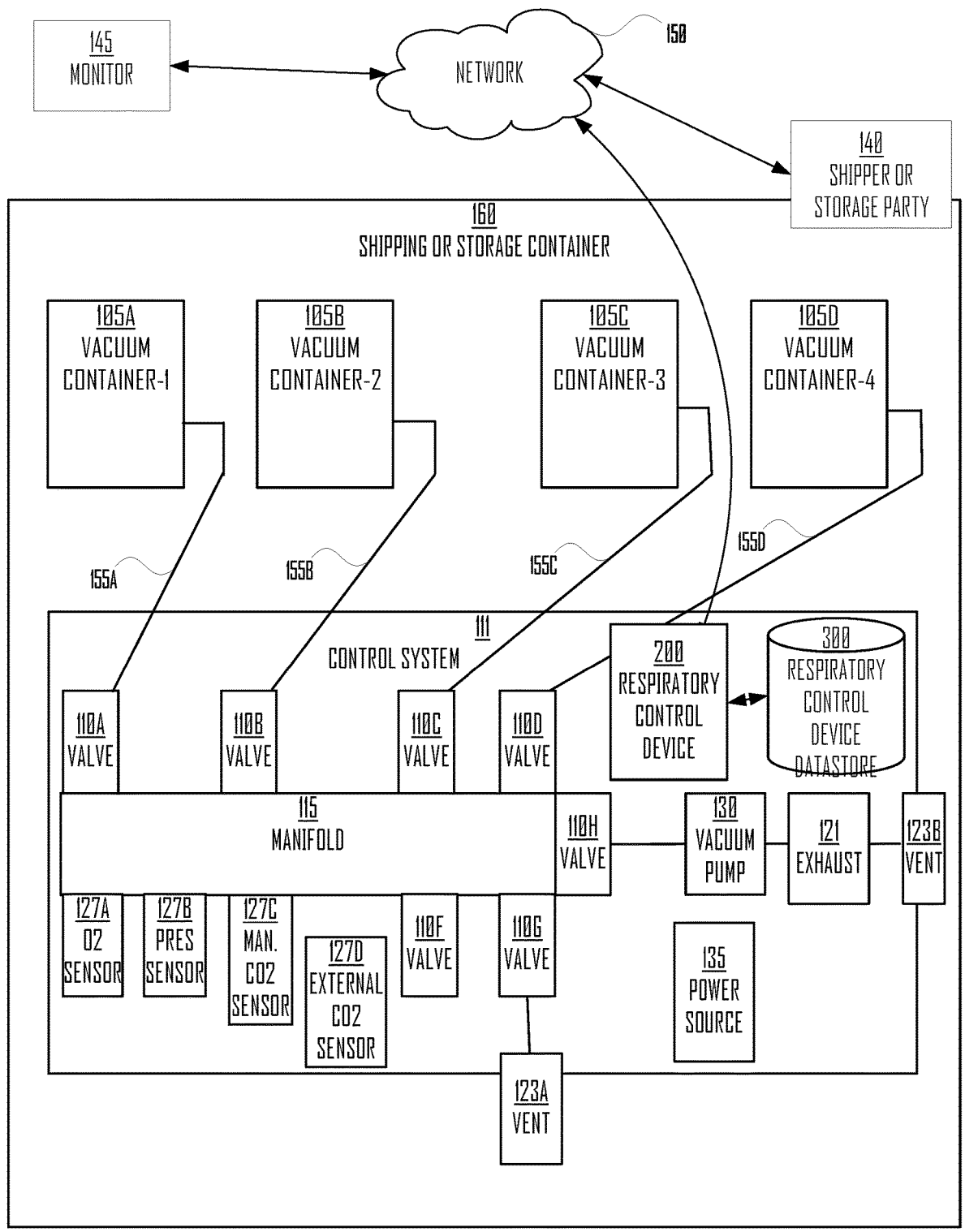
FIG. 1 is a network and device diagram illustrating an example of a shipping container containing a vacuum container, a valve connecting the vacuum container to a manifold, a sensor, a vent, a vacuum pump, a respiratory control device, a power source, and a network incorporated with teachings of the present disclosure, according to some embodiments.

Please see concluding remarks, in this Detailed Description, which contain defined terms and which describe how to read and interpret this Detailed Description. Elements labeled with a label number including a trailing letter, as in, "127A" or "127B" represent one or more similar such elements, potentially with variations; singular references herein to one such element or to any object or noun, regardless of whether drawn or whether labeled with a trailing letter, shall be understood to refer to one or more, unless the context makes clear otherwise. Where multiple variations are illustrated with a trailing letter, when referred to without the trailing letter, all such variations are referred to.

In overview, this disclosure relates to estimation or measurement of respiration of perishable commodities, including respiratory quotient or metabolic activity a perishable commodity in a low pressure vacuum chamber, including to reduce production of metabolic products associated with rot or spoilage.

Measurement of pressure and composition of gases in a vacuum container containing a perishable commodity may be performed under low absolute pressure conditions, e.g. with an absolute pressure in a vacuum chamber in a range between 5 and 380 Torr. Under such conditions, change in the composition of gases in the vacuum chamber may more closely reflect changes in the metabolic state or respiration of the perishable commodity, compared to change in composition of gases in a chamber containing perishable commodities at atmospheric pressure, where the influence of a perishable commodity may be difficult to discern.

Under low absolute pressure conditions, metabolic activity may be different than at atmospheric pressure. Under low absolute pressure conditions, plant stomata may be fully dilated, even in darkness. Oxygen may diffuse through a cell wall, independent of stomata, though, at least under atmospheric pressure, carbon dioxide primarily passes through stomata. Under low absolute pressure conditions, including under low absolute pressure conditions in which a leak rate of ambient atmospheric air, including oxygen, into the vacuum chamber is below a consumption rate of oxygen by the perishable commodity, measurement and or control of trace changes in pressure and or gas composition may be possible, may be reliable, and, with a suitable container, may be performed with respect to a relatively small quantity of perishable commodities. All vacuum chambers have a leak rate, e.g. the rate at which ambient air (including gas or liquid) leaks into a vacuum chamber even when "sealed" or closed. For a perishable commodity with a respiratory quotient of 1:1, if the leak rate introduces oxygen into the vacuum chamber below, for example, a consumption rate of oxygen by perishable commodities when undergoing aerobic respiration, then a change in a rate of pressure change in the vacuum chamber may indicate that the perishable commodities have switched to anaerobic respiration or are undergoing fermentation. The change in the rate of pressure change in the vacuum chamber may be obtained by determining a derivative of the rate of pressure change in the vacuum chamber.

If the leak rate in a vacuum chamber is constant, if the perishable commodity is undergoing a constant rate of aerobic or anaerobic respiration, and if the vapor pressure of oxygen and carbon dioxide is approximately equal, then the derivative of the rate of pressure change in the vacuum chamber should be, approximately, a horizontal line with zero slope or a very low slope. If the leak rate in the vacuum chamber is constant, if the perishable commodity switches from undergoing aerobic respiration to anaerobic respiration, in which carbon dioxide molecules are expelled without significant or with reduced consumption of oxygen, then the derivative of the rate of pressure change in the vacuum chamber should have, approximately, a positive slope during the transition from aerobic to anaerobic respiration. Therefore, a determination that the derivative of the rate of pressure change in the vacuum chamber has a positive slope may be an indicator that the plant has or is about to reach its anaerobic compensation point ("ACP").

Previous attempts to use vacuum chambers to store plants, including those which required continuous operation of a vacuum pump, may have had a leak rate of oxygen into the vacuum chamber which exceeded the consumption of oxygen by the plants in the vacuum chamber. Previous attempts at use of vacuum chambers to store plants may not have been concerned with anoxic (low oxygen) conditions inside such vacuum chambers, because anoxic conditions could not be achieved with the relatively high leak rate of oxygen into the vacuum chamber. Previous attempts at measurement of metabolic activity of plants at atmospheric pressure may not have recognized that measurement of metabolic respiratory products in a vacuum chamber at low absolute pressure would yield results that more accurately reflect metabolic activity.

Previous attempts to control atmosphere in a vacuum chamber at low absolute pressure attempted to maintain oxygen and or carbon dioxide within partial pressure bands (within floors and ceilings) within a low absolute pressure band and did not increase the low absolute pressure band and or the oxygen or carbon dioxide partial pressure, such as in response to increase in respiration and or temperature.

Previous attempts to control atmosphere in a vacuum chamber at low absolute pressure did not increase carbon dioxide partial pressure as a percentage of total pressure by allowing accumulation of carbon dioxide, released by the perishable commodity, introducing atmospheric air to provide oxygen and enable aerobic respiration, and increasing overall atmospheric pressure.

Disclosed are methods, apparatus and system to achieve a leak rate of oxygen into a vacuum chamber that may be below a rate of consumption of oxygen by perishable commodities in the vacuum chamber. Disclosed are methods, apparatus and system to measure or estimate at least one of ACP, RQ respiration, and or metabolic activity on a continuous basis in a vacuum chamber. Disclosed are methods, apparatus and system to measure or estimate at least one of ACP, RQ, respiration, and or metabolic activity at a rate which may be as fast as minute-by-minute in the vacuum chamber. Disclosed are methods, apparatus and system to measure or estimate at least one of ACP, RQ, respiration, and or metabolic activity based at least in part on change in change of pressure, change in oxygen consumption, or change in carbon dioxide production in the vacuum chamber. Disclosed are methods, apparatus and system to measure or estimate at least one of ACP, RQ respiration, and or metabolic activity based at least in part on change in composition of gases in the vacuum chamber. Disclosed are methods, apparatus and system to measure or estimate at least one of ACP, RQ respiration, and or metabolic activity based at least in part on change in composition of gases in the vacuum chamber, including a change in oxygen partial pressure. Disclosed are methods, apparatus and system to measure or estimate at least one of ACP, RQ respiration, and or metabolic activity based at least in part on change in composition of gases in the vacuum chamber, including a change in ethylene. Disclosed are methods, apparatus and system to measure or estimate at least one of ACP, RQ, respiration, and or metabolic activity based at least in part on change in composition of gases in the vacuum chamber, including a change in carbon dioxide partial pressure. The disclosed methods, apparatus and system may allow measurement or estimation of at least one of ACP, RQ respiration, and or metabolic activity when the perishable commodity undergoes aerobic or anaerobic respiration. Disclosed are methods, apparatus and system to alter the composition of gas in a vacuum chamber in order to influence at least one of ACP, RQ respiration, and or metabolic activity of perishable commodities in the vacuum chamber. Disclosed are methods, apparatus and system to alter the composition of gas in a vacuum chamber to reduce respiration to a lowest level possible, for a specific sample of perishable commodity, responding to hourly and daily changes and under conditions of the specific sample. Disclosed are methods, apparatus and system to alter the composition of gas in a vacuum chamber to slow or accelerate ripening or spoilage of a perishable commodity in the vacuum chamber. The methods, apparatus and system may further comprise at least one of cooling of a vacuum chamber and or use of antimicrobials with respect to perishable commodities in the vacuum chamber.

FIG. 1 is a network and device diagram illustrating an example of shipping or storage container 160 containing vacuum containers 105A-105D and control system 111. Shipping or storage container 160 is not necessary but illustrates an example of an environment in which one or more vacuum containers 105 and control system 111 may be found and which may be used to store and or transport a perishable commodity. Other environments may be suited to ship or storing perishable commodities. A greater or lesser number of vacuum containers 105 may be used. Conditions, such as a temperature of shipping or storage container 160, may be poorly controlled, controlled by a third party, subject to variability, and the like.

Vacuum containers 105 are chambers capable of withstanding atmospheric air pressure when the interior space, within the vacuum container 105, is depressurized to an internal absolute pressure on the order of 5 and 380 Torr (herein, "low absolute pressure"), and arranged to contain perishables. Vacuum containers 105 may be, for example, rectangular or tubular bodies, with end caps. End caps may be removable, to allow arrangement of perishables within vacuum container 105. A seal may be present between the bodies and the end caps. Structures may be present in the bodies and or end caps to strengthen vacuum container 105 against ambient air pressure when absolute pressure within vacuum container 105 is in the low absolute pressure range. Such structures may comprise bulkheads, stringers, and or braces, including an internal brace, and or an internal rod from one end to another end.

Vacuum containers 105 are connected to control system 111 by one or more vacuum tubes 155A-155D. Vacuum tubes 155 may each comprise two (or more) sub-vacuum tubes; where multiple sub-vacuum tubes lead to a single vacuum container 105, a first sub-vacuum tube may be used to withdraw gas from vacuum container 105, while a second sub-vacuum tube may be used to introduce gas into vacuum container 105. A single vacuum tube may be used to both withdraw and introduce gas into vacuum container 105. Vacuum tubes 155 are fabricated to resist collapse under standard air pressure, notwithstanding low internal air pressure. Vacuum tubes 155 may connect to valves 110.

One or more vacuum containers 105 may be depressurized by a vacuum pump, whether or not through use of control system 111, sealed, and then later connected to control system 111 by one or more vacuum tubes 155.

Valves 110 may be operated manually or electronically, such as by activation of a solenoid or the like. Valves 110 may be opened and closed by respiratory control device 200. Electrical wiring, not illustrated, may connect valves 110 to respiratory control device 200 for electrical control of valves 110 by respiratory control device 200. Atmosphere monitor and control device 200 may utilize respiratory monitor and management module 400 (discussed further herein) to activate one or more of valves 110 to create a connection between one or more of vacuum containers 105 and equipment in control system 111.

For example, all valves 110 may be closed, except valve 110D may be opened to connect vacuum tube 155D to manifold 115 and valve 110H may be opened to connect manifold 115 to vacuum pump 130. Gas may be then withdrawn from vacuum container-4 105D by vacuum pump 130, via manifold 115.

For example, all valves 110 may be closed, except valve 110H, connecting manifold 115 to vacuum pump 130. Vacuum pump 130 may draw the pressure within manifold 115 below a pressure in vacuum container-2 105B. Valve 110H may then be closed. Valve 110B may then be opened, exposing vacuum container-2 105B to the lower pressure in manifold 115 and allowing gas in vacuum container-2 105B to flow into manifold 115. Other configurations and methods of using manifold 115 are discussed herein.

Valves (not illustrated) may be present between sensors 127 and manifold 115. Sensor 127 may comprise, for example, one or more of a gas sensor, such as one or more of manifold carbon dioxide sensor 127C or external carbon dioxide (or oxygen) sensor 127D, oxygen sensor 127A, a moisture or humidity sensor, an ion sensor, oxygen sensor 127A, a mass-spectrometer, a pH sensor, a pressure sensor, a temperature sensor, an ethylene sensor, or the like. One or more of sensor 127 may be directed toward and or integrated into manifold 115, into one or more vacuum container 105, or into a vacuum tube 155. Pressure sensors and other sensors may be present in vacuum container 105, with suitable connection to respiratory control device 200. An air filter may be present between manifold 115 and sensor 127 or between vacuum pump 130 and manifold 115 or vacuum container 105. An air filter may comprise, for example, one or more of a fiber filter, an activated charcoal filter, a membrane, a water or liquid filter, or the like. An air filter may be used to prevent an antimicrobial, or other material, whether in gas, liquid, aerosolized or other form from clogging or contaminating valve 110 or sensor 127.

In addition to valves 110 and sensors 127, equipment in control system 111 may comprise an air filter, vacuum pump 130, exhaust 121, respiratory control device 200, respiratory control device datastore 300, vent 123A and 123B, power source 135, and antimicrobial delivery technologies. Power source 135 may comprise a battery, an external power supply, a generator, or the like. Power source 135 may provide power to respiratory control device 200, valves 110, sensors 127, vacuum pump 130, an antimicrobial delivery unit, and other equipment on and components of control system 111 and shipping or storage container 160, through electrical lines, not illustrated.

Figure 2:
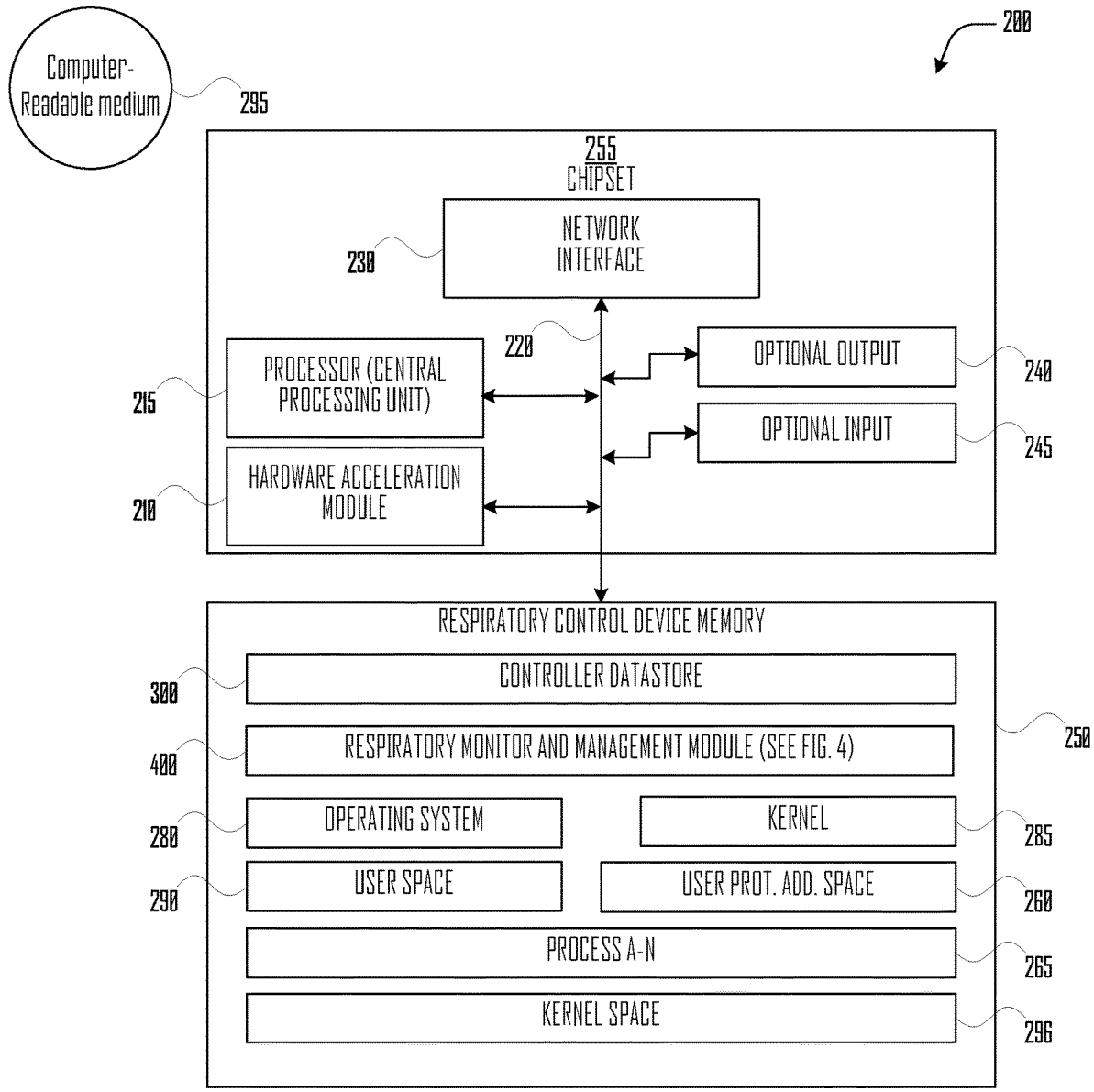
FIG. 2 is a functional block diagram illustrating an example of the respiratory control device incorporated with teachings of the present disclosure, according to some embodiments.

Atmosphere monitor and control device 200 is discussed further in relation to FIG. 2.

Manifold 115 may be a space, pipe, or volume into or from which other pipes or vacuum tubes connect and which is generally sealed against uncontrolled entry of gas or liquid.

Vacuum pump 130 may be, for example, a scroll compressor, a piston compressor or pump, a turbine pump, or the like, suitable to develop low absolute pressure in vacuum container 105.

As illustrated in FIG. 1, respiratory control device 200 may connect to network 150. Network 150 in FIG. 1 may comprise computers, network connections among the computers, and software routines to enable communication between the computers over the network connections. Examples of network 150 comprise an Ethernet network, the Internet, and or a wireless network, such as a GSM, TDMA, CDMA, EDGE, HSPA, LTE, satellite service, or other network provided by a wireless service provider. Connection to network 150 may be via a Wi-Fi or wired connection. More than one network may be involved in a communication session between the illustrated devices. Connection to network 150 may require that the computers execute software routines which enable, for example, the seven layers of the OSI model of computer networking or equivalent in a wireless phone network. Connection to network 150 may occur transiently and or opportunistically, such as when shipping or storage container 160 arrives or departs a destination, when shipping or storage container 160 is opened, when a satellite connection is available, or the like.

In FIG. 1, respiratory control device 200 is illustrated as connecting to respiratory control device datastore 300. Atmosphere monitor and control device datastore 300 is described further, herein, though, generally, should be understood as a datastore used by respiratory control device 200.

Shipper or storage party 140 in FIG. 1 may comprise computers of a shipping, freight forwarding, storage party, or the like company or organization, which party may have a financial or other interest in the status of shipping or storage container 160 and or of vacuum container 105. Computers of shipper or storage party 140 may be stationary or may be present on a shipping vessel, such as a boat or a truck. Computers of shipper or storage party 140 may form a network connection with respiratory control device 200, either directly or indirectly, such as, for example, through network 150. Monitor 145 in FIG. 1 may comprise computers of a grower, a purchaser, an operator of respiratory control device 200 or the like company or organization, which party may have a financial or other interest in the status of shipping or storage container 160, respiratory control device 200, vacuum container 105, and or of a perishable commodity therein. Shipper or storage party 140 and or monitor 145 may receive information regarding the status of shipping or storage container 160, respiratory control device 200, and or of vacuum container 105.

FIG. 2 is a functional block diagram illustrating an example of respiratory control device 200 incorporated with teachings of the present disclosure, according to some embodiments. Atmosphere monitor and control device 200 may include chipset 255. Chipset 255 may include processor 215, input/output (I/O) port(s) and peripheral devices, such as output 240 and input 245, and network interface 230, and respiratory control device memory 250, all interconnected via bus 220. Network interface 230 may be utilized to form connections with network 150, with respiratory control device datastore 300, or to form device-to-device connections with other computers.

Chipset 255 may include communication components and or paths, e.g., buses 220, that couple processor 215 to peripheral devices, such as, for example, output 240 and input 245, which may be connected via I/O ports. Processor 215 may include one or more execution cores (CPUs). For example, chipset 255 may also include a peripheral controller hub (PCH) (not shown). In another example, chipset 255 may also include a sensors hub (not shown). Input 245 and output 240 may include, for example, user interface device(s) including a display, a touch-screen display, printer, keypad, keyboard, etc., sensor(s), including sensors discussed in relation to sensors 127, accelerometer, global positioning system (GPS), gyroscope, etc., communication logic, wired and or wireless, storage device(s) including hard disk drives, solid-state drives, removable storage media, etc. I/O ports for input 245 and output 240 may be configured to transmit and or receive commands and or data according to one or more communications protocols. For example, one or more of the I/O ports may comply and or be compatible with a universal serial bus (USB) protocol, peripheral component interconnect (PCI) protocol (e.g., PCI express (PCIe)), or the like.

Hardware acceleration module 210 may provide hardware acceleration of various functions otherwise performed by modules and devices disclosed herein. Hardware acceleration module may be provided by, for example, Integrated Performance Primitives software library by Intel Corporation, as may be executed by an Intel (or other compatible) chip, and which may implement, for example, a library of programming functions involved with real time computer processing. Such a library includes, for example, OpenCV. OpenCV includes, for example, a statistical machine learning library including boosting, decision tree learning, gradient boosting trees, expectation-maximization algorithms, k-nearest neighbor algorithm, naïve Bayes classifier, artificial neural networks, random forest, and a support vector machine. In embodiments, hardware acceleration module 210 may be a programmed or programmable FPGA, i.e., a FPGA which gate arrays are configured with a bit stream to embody the logic of the hardware accelerated function (equivalent to the logic provided by the executable instructions of a software embodiment of the function). In embodiments, hardware acceleration module 210 may also or alternatively include components of or supporting respiratory control device memory 250.

Atmosphere monitor and control device memory 250 may generally comprise a random access memory ("RAM"), a read only memory ("ROM"), and a permanent mass storage device, such as a disk drive or SDRAM (synchronous dynamic random-access memory). Atmosphere monitor and control device memory 250 may store program code for modules and or software routines, such as, for example, hardware acceleration module 210, respiratory control device datastore 300 (illustrated and discussed further in relation to FIG. 3), and perishable-container monitor module (illustrated and discussed further in relation to FIG. 4).

Atmosphere monitor and control device memory 250 may also store operating system 280. These software components may be loaded from a non-transient computer readable storage medium 295 into respiratory control device memory 250 using a drive mechanism associated with a non-transient computer readable storage medium 295, such as a floppy disc, tape, DVD/CD-ROM drive, memory card, or other like storage medium. In some embodiments, software components may also or instead be loaded via a mechanism other than a drive mechanism and computer readable storage medium 295 (e.g., via network interface 230).

Figure 3:
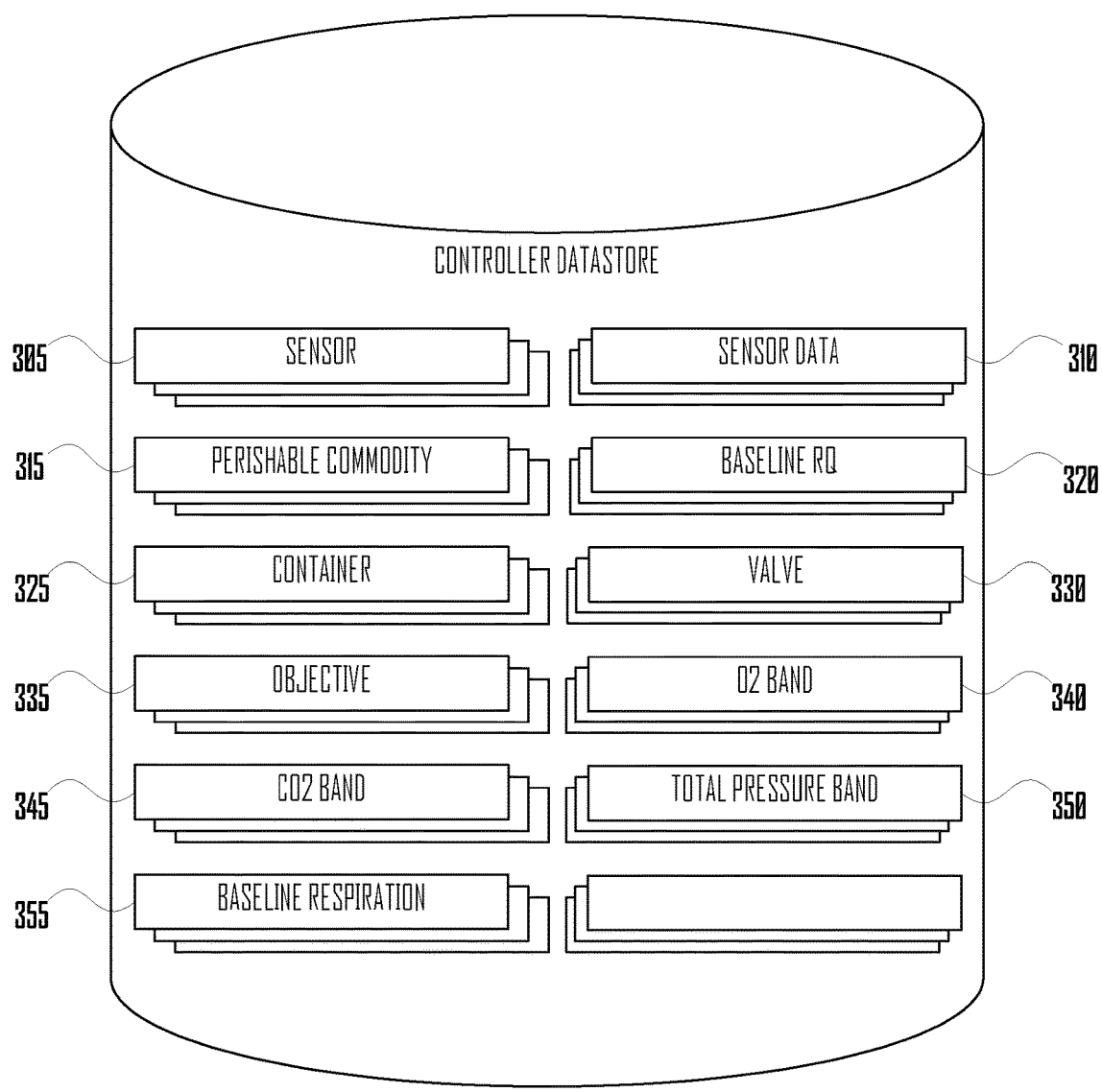
FIG. 3 is a functional block diagram illustrating an example of a respiratory control device datastore incorporated with teachings of the present disclosure, consistent with embodiments of the present disclosure.

Atmosphere monitor and control device memory 250 is also illustrated as comprising kernel 285, kernel space 296, user space 290, user protected address space 260, and respiratory control device datastore 300 (illustrated and discussed further in relation to FIG. 3).

Atmosphere monitor and control device memory 250 may store one or more process 265 (i.e., executing software application(s)). Process 265 may be stored in user space 290. Process 265 may include one or more other process 265*a* . . . 265*n*. One or more process 265 may execute generally in parallel, i.e., as a plurality of processes and or a plurality of threads.

Atmosphere monitor and control device memory 250 is further illustrated as storing operating system 280 and or kernel 285. The operating system 280 and or kernel 285 may be stored in kernel space 296. In some embodiments, operating system 280 may include kernel 285. Operating system 280 and or kernel 285 may attempt to protect kernel space 296 and prevent access by certain of process 265*a* . . . 265*n*.

Kernel 285 may be configured to provide an interface between user processes and circuitry associated with respiratory control device 200. In other words, kernel 285 may be configured to manage access to processor 215, chipset 255, I/O ports and peripheral devices by process 265. Kernel 285 may include one or more drivers configured to manage and or communicate with elements of respiratory control device 200 (i.e., processor 215, chipset 255, I/O ports and peripheral devices).

Atmosphere monitor and control device 200 may also comprise or communicate via Bus 220 and or network interface 230 with respiratory control device datastore 300, illustrated and discussed further in relation to FIG. 3. In various embodiments, bus 220 may comprise a high speed serial bus, and network interface 230 may be coupled to a storage area network ("SAN"), a high speed wired or wireless network, and or via other suitable communication technology. Atmosphere monitor and control device 200 may, in some embodiments, include many more components than as illustrated. However, it is not necessary that all components be shown in order to disclose an illustrative embodiment.

FIG. 3 is a functional block diagram illustrating an example of a respiratory control device datastore 300 incorporated with teachings of the present disclosure, consistent with embodiments of the present disclosure.

The components of respiratory control device datastore 300 may include data groups used by modules and or routines, e.g, sensor 305, sensor data 310, perishable 315, container 325, valve 330, and sensor objective 335 (described herein in discussion of other of the Figures). The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

Figure 4:
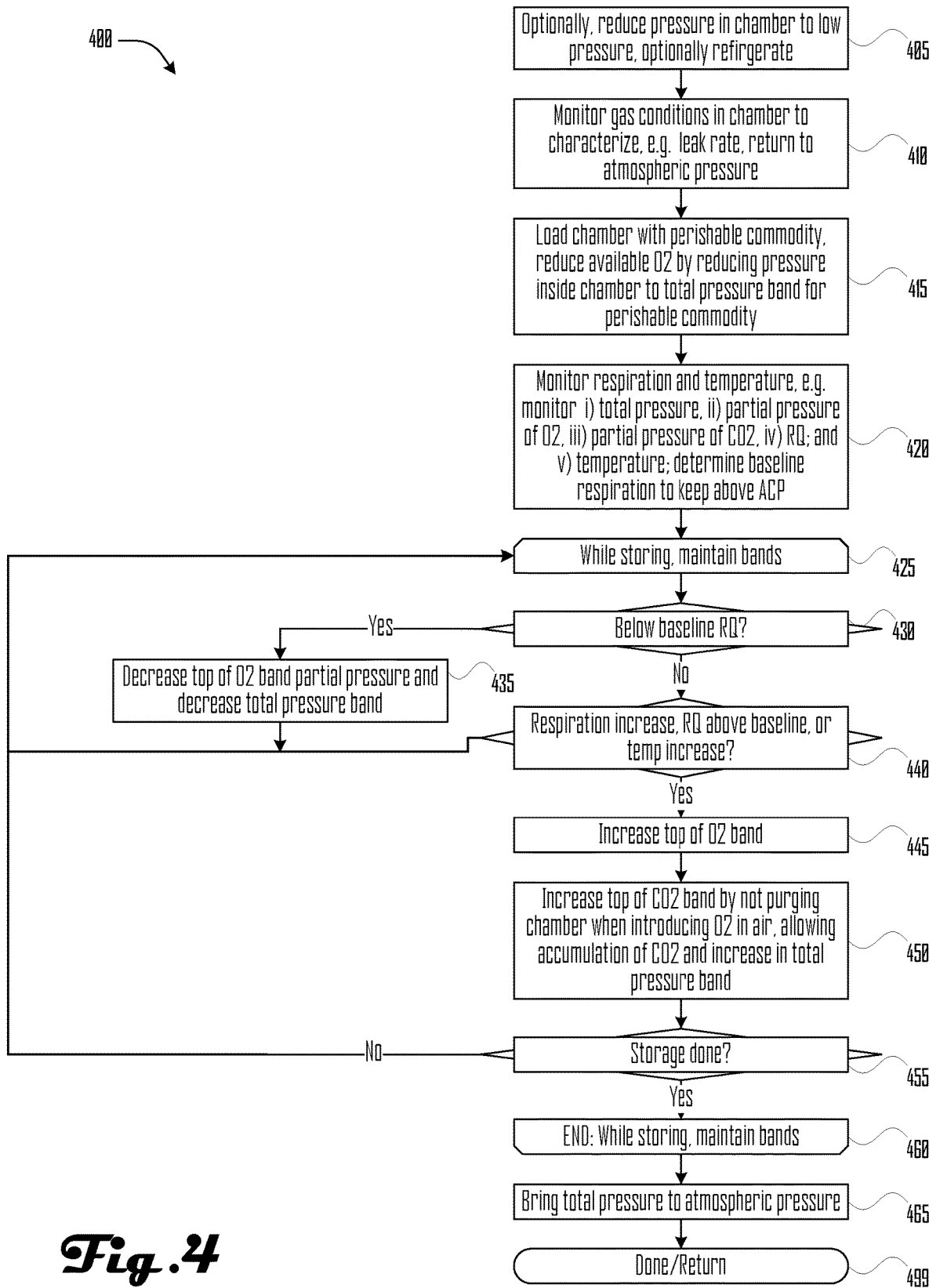
FIG. 4 illustrates example of a method performed by a respiratory monitor and management module, according to some embodiments.

FIG. 4 is a flow diagram illustrating an example of a method performed by respiratory quotient monitor module 400, according to some embodiments. Metabolic monitor and management module 400 may be performed by, for example, respiratory control device(s), such as respiratory control device 200, according to some embodiments. Respiratory control device 200 may be coupled with, for example, control system 111 and one or more vacuum containers 105, as illustrated and discussed in relation to FIG. 1. Components of respiratory monitor and management module 400 may be performed by or with assistance from a hardware accelerator, such as hardware accelerator module 210.

At block 405, which, along with other blocks may be optional (not all optional blocks are identified as "optional"), respiratory monitor and management module 400 may, with vacuum container 105 empty, reduce absolute pressure in vacuum container 105 to a low absolute pressure range, e.g. 5 and 380 Torr or a pressure range according to a total pressure band 350 associated with a perishable commodity 315 to be put into a vacuum container 105, and may optionally refrigerate vacuum container 105 or measure a temperature inside vacuum container 105 and record such measurement to a sensor data 310 record.

At block 410, respiratory monitor and management module 400 may monitor pressure and or oxygen and or carbon-dioxide or pressure and or concentration of another gas constituent in vacuum container 105. Monitoring such values may involve recording values to one or more sensor data 310 records. Monitoring such values may involve determining change in such values over time. Monitoring such values may involve determining a rate of change in such values over time, such as determination of a derivative of the rate of change. Monitoring such values may involve identifying, if possible, a rate of change in such values over time or a rate of change which can be characterized mathematically. Monitoring such values may involve changing temperature and recording change in such values as temperature changes. In embodiments, pressure and or oxygen and or carbon dioxide and or ethylene may be the only parameter(s) which is(are) monitored. In embodiments, monitoring such values may characterize a leak rate in vacuum container 105 and or supporting systems. In embodiments, characterizing the leak rate may be in relation to values monitored at block 410. For example, the leak rate may be characterized in terms of a change in pressure, oxygen, and or carbon-dioxide over time.

At block 410, block 410, respiratory monitor and management module 400 may determine a relationship between the leak rate and a consumption of oxygen in vacuum container 105, such as whether the leak rate introduces more or less oxygen than a volume of perishable commodity 315 may consume at a temperature of vacuum container 105. Respiratory monitor and management module 400 may further determine a response of the leak rate to change in temperature.

At a conclusion of block 410, respiratory monitor and management module 400 may raise absolute pressure in vacuum container 105 to ambient atmospheric pressure, allowing the vacuum container 105 to be opened.

At block 415, perishable commodities or other material may be put in vacuum container 105 and vacuum container 105 may be sealed. If not performed previously, a perishable commodity 315 record may be associated with a container 325 record. To reduce oxygen available to the perishable commodities and to thereby suppress respiration of the perishable commodities, absolute pressure in vacuum container 105 may be reduced to a low absolute pressure range. The low absolute pressure range may have a floor and a ceiling or a "band". The low absolute pressure band may be specific to the perishable commodity. The low absolute pressure band may be specific to the perishable commodity, based on experience with the perishable commodity, and determined to suppress respiration. The absolute pressure band may be recorded in one or more total pressure band 350 records. Furthermore, perishable commodity 315 may be associated with a baseline RQ for perishable commodity 315. The baseline RQ may be specific to the perishable commodity. The baseline RQ may be specific to the perishable commodity, based on experience with the perishable commodity. The baseline RQ may be recorded in one or more baseline RQ 320 records. As discussed herein, respiration of a perishable commodity may be lower in a vacuum chamber at low absolute pressure than it is at atmospheric pressure.

At block 415, vacuum container 105 may be refrigerated.

At block 420, respiratory monitor and management module 400 may monitor respiration by the perishable commodity in the vacuum container 105. Respiratory monitor and management module 400 may monitor respiration by monitoring total pressure, partial pressure of oxygen, temperature, and RQ. RQ may be computed by dividing carbon dioxide production rate by an oxygen uptake rate. Respiratory monitor and management module 400 may optionally adjust or compensate values by the leak rate characterized in block 410. In embodiments, respiratory monitor and management module 400 may determine a derivative of values obtained at block 420.

At block 420, respiratory monitor and management module 400 may determine a minimum oxygen level required to keep perishable commodity 315 from reaching its ACP. The minimum oxygen may be determined based on looking up the minimum oxygen level in a table. The minimum oxygen level may be determined by reducing oxygen, wherein reduction of oxygen is performed, for example, by reducing total pressure, such as through activation of valves 110 and or vacuum pump 130, until RQ for perishable commodity 315 rises above an RQ value associated with the ACP for perishable commodity 315. When the ACP for perishable commodity 315 is identified, the level of oxygen required to maintain perishable commodity 315 below the ACP may be set as the minimum oxygen level, and respiratory monitor and management module 400 may then increase the level of oxygen and the total pressure to the minimum oxygen level. The minimum oxygen level required to keep perishable commodity 315 from reaching its ACP may also be understood as the minimum aerobic respiration, minimum metabolic activity, or baseline respiration for perishable commodity 315, wherein the baseline respiration is required to avoid anaerobic respiration and undesirable metabolic products of anaerobic respiration; increases above the baseline respiration may allow greater aerobic respiration to occur which may be healthy for perishable commodity in the short term (e.g. in terms of minutes or hours) but which may be unhealthy in the long term (e.g. in terms of days). Unnecessarily high aerobic respiration may be unhealthy in the long term because perishable commodity 315 needs to be stored for a long period of time (e.g. days, weeks, or months) and aerobic respiration will wear out the cellular substrate and or cause perishable commodity 315 to consume its internal energy sources, such as sugars and carbohydrates, such that, over the long term, perishable commodity may switch to anaerobic respiration and develop undesired metabolic products thereof. The baseline respiration may also include an expected carbon dioxide emission rate at the minimum oxygen level. To the extent that baseline respiration and minimum oxygen level are different, the baseline respiration may be stored in one or more baseline respiration 355 records.

The minimum oxygen level and baseline respiration may be used by respiratory monitor and management module 400 to set a bottom of an oxygen band for perishable commodity 315, such as in an oxygen band 340 record. The top of the oxygen band may be set to allow respiratory control device 200 to operate without continuous operation of vacuum pump 130; e.g., to provide oxygen to perishable commodity 315 in vacuum container 105 which will be consumed and which may need to be refreshed, by re-introducing external air and by activating vacuum pump 130 to reduce total pressure to maintain total pressure within total pressure band 350.

Opening loop block 425 to closing loop block 460 may iterate so long as vacuum container 105 is in a storage state (e.g. is not opened to the external atmosphere). During opening loop block 425 to closing loop block 460, respiratory monitor and management module 400 may monitor and record total pressure, partial pressure of oxygen, partial pressure of carbon dioxide, RQ, and temperature, such as according to a schedule. The schedule may be once per day or faster, such as once per minute. The schedule may be adjusted, based on previous rates of change, where a faster rate of change results in more measurements for a given time period and a slower rate of change results in fewer measurements for the given time period.

If measurement of a gas partial pressure, such as of oxygen or carbon dioxide, cannot be reliably performed at low absolute pressure, measurement of such gas may be performed by, for example, opening vacuum container 105 to manifold 115, such as via valve 110, and allowing gas equilibrium to be established between vacuum container 105 and manifold 115. Manifold 115 may then be closed and manifold 115 may be opened to the atmosphere and then sealed again. The gas partial pressure may then be measured in the manifold, with the measurement compensated according to the amount of air introduced and the concentration of the gas in the introduced air (as may be measured by, for example, external carbon dioxide (or oxygen) sensor 127D.

During opening loop block 425 to closing loop block 460, respiratory monitor and management module 400 may maintain partial pressure of oxygen and carbon dioxide within oxygen and carbon dioxide bands; e.g. within oxygen band 340, carbon dioxide band 345, and or total pressure band 350. These bands may also be referred to as "floors and ceilings". For example, if partial pressure of oxygen goes down and or if partial pressure of carbon dioxide increases, then respiratory monitor and management module 400 may activate valves to add additional oxygen into vacuum chamber 105. Oxygen may be added by respiratory monitor and management module 400 by adding external atmospheric air into vacuum chamber 105. Respiratory monitor and management module 400 may, for example, activate valves 110 and or vacuum pump 130 to introduce a gas of interest, such as oxygen or carbon dioxide and or to increase or reduce a total pressure in vacuum container 105. The gas of interest may be a component of another gas, such as external atmospheric air, which may also be referred to herein as an "oxygen containing gas", and or a concentrated source of the gas of interest. Introduction of the gas of interest may be performed in steps, such as using manifold 115 to introduce units of the gas of interest. When a gas containing the gas of interest is introduced, concentration of the gas of interest may be measured in the gas containing the gas of interest. For example, respiratory monitor and management module 400 may introduce ambient air, including ambient oxygen, into vacuum container 105. Oxygen may be introduced through, for example, activation of one or more valves 110 to allow, for example, ambient air into vacuum container 105. One or more of valve 110 which may have a controlled flow rate, to introduce an amount of air into vacuum chamber 105 based on a length of time that valve 110 is open. An amount of ambient air or another gas may introduced by, for example, allowing manifold 115 or another standard volume to fill with ambient air or the gas to be introduced, to then seal off manifold 115 from ambient air or the gas supply, and to then open one or more valves 110 between manifold 115 and vacuum container 105, to allow the higher pressure air or gas in manifold 115 (or the other standard volume) to flow into and equalize with vacuum container 105. In embodiments, other or additional gas or aerosolized compound may be introduced into vacuum container, such as from a tank of oxygen, a tank of nitrogen, a tank of carbon dioxide, ethylene, a sachet of antimicrobial, or the like. In embodiments, respiratory monitor and management module 400 may measure an oxygen, carbon dioxide, or other component of ambient air, such as with external carbon dioxide sensor 2370, and may determine an amount of ambient air to introduce into vacuum container 105 to achieve a level or concentration of oxygen or other component in vacuum container 105.

For example, after oxygen is added, total pressure in vacuum chamber 105 may exceed a ceiling for total pressure, in which case vacuum pump 130 may be activated to reduce total pressure to below the ceiling.

At decision block 430, respiratory monitor and management module 400 may determine whether RQ for perishable commodity 315 has fallen below a baseline RQ associated with perishable commodity 315, which indicates low carbon dioxide production and which indicates good health of the living substrate of cells in perishable commodity 315. A baseline RQ may be obtained from, for example, a baseline RQ 320 record. Such an indication may indicate that the minimum oxygen level determined in block 420 may be unnecessarily high and may be allowing higher aerobic respiration than is necessary to maintain health of perishable commodity and avoid products of anaerobic respiration in the long term.

If affirmative or equivalent at decision block 430, at block 435, respiratory monitor and management module 400 may lower or decrease a top of oxygen band 340 associated with perishable commodity 315 and may lower or decrease a top of total pressure band 350 for perishable commodity 315 in vacuum chamber 105. This may be performed to extend the healthy shelf life of perishable commodity 315.

If negative or equivalent at decision block 430, at decision block 440, respiratory monitor and management module 400 may determine whether an increase in respiration has occurred, whether RQ has gone above a baseline RQ for perishable commodity 315 (the baseline RQ being below the ACP for perishable commodity 315), or if an increase in temperature has occurred. For example, an increase in a rate of oxygen consumption and or an increase in a rate of production of carbon dioxide, even at a constant RQ, may indicate an increase in respiration. For example, an increase in rate of production of carbon dioxide with a decrease in a rate of oxygen consumption may result in RQ increasing above 1:1 or above 1:1.3, which may indicate anaerobic metabolism and or fermentation. For example, an increase in temperature may cause metabolic activity and respiration for perishable commodity 315 to increase.

If no or equivalent at decision block 430, respiratory monitor and management module 400 may return to opening loop block 425, to maintain floors and ceilings or bands for, for example, oxygen, carbon dioxide, and total pressure.

If affirmative or equivalent at decision block 440, in which case respiration has been determined to be increasing, at block 445 respiratory monitor and management module 400 may increase a top band or ceiling of oxygen partial pressure within vacuum chamber 105. This increase may be recorded in, for example an oxygen band 340 record. The increase may be an incremental step, determined by experience with the perishable commodity in vacuum chamber 105. The increase in the top band or ceiling of oxygen partial pressure within vacuum chamber 105 may be implemented by, for example, adding oxygen to vacuum chamber 105. Oxygen may be added, as discussed, by respiratory monitor and management module 400 adding external atmospheric air into vacuum chamber 105.

Respiratory monitor and management module 400 may introduce ambient air, including ambient oxygen, or another source of gas into vacuum container 105. Oxygen may be introduced through, for example, activation of one or more valves 110 to allow, for example, ambient air into vacuum container 105. One or more of valve 110 which may have a controlled flow rate, to introduce an amount of air into vacuum chamber 105 based on a length of time that valve 110 is open. An amount of ambient air or another gas may introduced by, for example, allowing manifold 115 or another standard volume to fill with ambient air or the gas to be introduced, to then seal off manifold 115 from ambient air or the gas supply, and to then open one or more valves 110 between manifold 115 and vacuum container 105, to allow the higher pressure air or gas in manifold 115 (or the other standard volume) to flow into and equalize with vacuum container 105. In embodiments, other or additional gas or aerosolized compound may be introduced into vacuum container, such as from a tank of oxygen, a tank of nitrogen, a tank of carbon dioxide, ethylene, a sachet of antimicrobial, or the like. In embodiments, respiratory monitor and management module 400 may measure an oxygen, carbon-dioxide, or other component of ambient air, such as with external carbon dioxide sensor 2370, and may determine an amount of ambient air to introduce into vacuum container 105 to achieve a level or concentration of oxygen or other component in vacuum container 105.

At block 450, respiratory monitor and management module 400 may increase a top of a carbon dioxide partial pressure band. This may be recorded in one or more carbon dioxide band 345 records. Increasing the top of the carbon dioxide partial pressure band may be implemented by not purging, or by not pumping out or by partially pumping out, vacuum chamber 105 after oxygen is added to vacuum chamber 105. Therefore, increasing the top of the carbon dioxide may further comprise increasing a total system pressure in block 455.

At decision block 455, respiratory monitor and management module 400 may determine whether a storage period has concluded. A storage period may conclude, for example, after passage of a period of time, after obtaining a date, after a condition has occurred in relation to the perishable commodity, and the like.

If negative or equivalent at decision block 455, respiratory monitor and management module 400 may return to opening loop block 425. If affirmative or equivalent at decision block 455, respiratory monitor and management module 400 may proceed to closing loop block 460 and may then also proceed to block 465.

At block 465, respiratory monitor and management module 400 may bring total pressure within vacuum chamber 105 to atmospheric pressure.

Upon occurrence of an interrupt or exit condition, respiratory monitor and management module 400 may proceed to done or return block 499. At done or return block 499, respiratory monitor and management module 400 may conclude or may return to another process.

Atmosphere monitor and control device 200 may be provided by a range of computational devices including one or more microprocessors, microcontrollers, an embedded computer system, a server, a workstation computer, a desktop computer, a laptop computer, a tablet computer (e.g., iPad®, GalaxyTab® and the like), an ultraportable computer, an ultramobile computer, a netbook computer and or a subnotebook computer; a mobile telephone including, but not limited to a smart phone, (e.g., iPhone®, Android®-based phone, Blackberry®, Symbian®-based phone, Palm®-based phone, etc.).

Embodiments of the operations described herein may be implemented in a computer-readable storage device having stored thereon instructions that when executed by one or more processors perform the methods. The processor may include, for example, a processing unit and or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and or later and or related versions of this specification.

As used in any embodiment herein, the term "logic" may refer to the logic of the instructions of an app, software, and or firmware, and or the logic embodied into a programmable circuitry by a configuration bit stream, to perform any of the aforementioned operations. Software may be embodied as a software package, code, instructions, instruction sets and or data recorded on non-transitory computer readable storage medium. Firmware may be embodied as code, instructions or instruction sets and or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and or logic implementation(s) for the various logic and or circuitry described herein. For example, in one embodiment the hardware description language may comply or be compatible with a very high speed integrated circuits (VHSIC) hardware description language (VHDL) that may enable semiconductor fabrication of one or more circuits and or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and or other versions of the IEEE VHDL standards and or other hardware description standards.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

As used herein, "low absolute pressure" refers to an absolute pressure between 5 and 380 Torr. The vapor pressure of water ranges from approximately 4.6 at zero degrees Celsius to approximately 92.5 Torr at fifty degrees Celsius. In embodiments, the bottom end of the range for "low absolute pressure" conditions as used herein may be selected to not drop below the vapor pressure of water at the then-current temperature.

As used herein, "absolute pressure" refers to a pressure of a gas measured relative to zero pressure.

As used herein, "vacuum pressure" refers to a difference between an absolute pressure inside of a vessel or chamber and an absolute pressure around the vessel or chamber.

As used herein, "oxygen" refers to molecular oxygen, two oxygen atoms held together by a covalent bond.

As used herein, "anaerobic compensation point" or "ACP" occurs when a plant switches from predominantly aerobic metabolic activity or respiration to predominantly anaerobic metabolic activity or respiration.

During aerobic metabolic activity or aerobic respiration, an organism converts nutrients, such as sugars, carbohydrates, amino acids, and fatty acids into energy using oxygen as an electron acceptor in an oxidation reaction, releasing carbon dioxide and consuming oxygen in an approximately 1:1 ratio. Aerobic respiration is more efficient at producing adenosine triphosphate ("ATP") than anaerobic respiration.

During anaerobic metabolic activity or aerobic respiration, an organism converts nutrients, such as sugars, carbohydrates, amino acids, and fatty acids into energy using a non-oxygen electron acceptor, such as an inorganic electron acceptor, such as sulfate or nitrate, releasing carbon dioxide with reduced oxygen consumption compared to aerobic respiration. Anaerobic respiration is less efficient at producing ATP than anaerobic respiration.

During fermentation, hexose sugars are converted into carbon dioxide and ethanol in an extracellular process, typically (though not exclusively) in the absence of oxygen. Anaerobic respiration occurs in the absence of oxygen, also converts hexose sugars into carbon dioxide and ethanol, though is an intracellular process. In fermentation, glycolysis does not follow citric acid cycle and electron transport chain; pyruvate molecules are converted into lactic acid or ethanol. In anaerobic respiration, glycolysis follows citric acid cycle and electron transport chain and the final electron acceptor is an inorganic molecule such as sulfate, nitrate, or carbon dioxide. In fermentation, four ATP are produced. In anaerobic respiration, thirty eight ATP are produced. Fermentation is less efficient than both anaerobic respiration and aerobic respiration.

Following are non-limiting examples:

Example 1. An apparatus to reduce respiration of a perishable commodity in a low pressure chamber, comprising: the low pressure chamber, a gas measurement and management system, a computer processor and a memory, and a respiratory management module in the memory to manage respiration of the perishable commodity in the low pressure chamber; wherein to manage respiration of the perishable commodity in the low pressure chamber, the processor is to execute the respiratory management module and the respiratory management module is to use the gas measurement and management system and the low pressure chamber to: obtain a total absolute pressure in the low pressure chamber, obtain at least one of a carbon dioxide partial pressure in the low pressure chamber or an oxygen partial pressure in the low pressure chamber; reduce the total absolute pressure to a low absolute pressure, wherein the low absolute pressure is above an anaerobic compensation point for the perishable commodity; determine a respiration of the perishable commodity in the low pressure chamber at the low absolute pressure; and in response to the respiration of the perishable commodity in the low pressure chamber, control a gas composition and the low absolute pressure in the low pressure chamber to reduce aerobic respiration of the perishable commodity and avoid anaerobic respiration of the perishable commodity in the low pressure chamber.

Example 2. The apparatus according to Example 1, wherein to reduce the total absolute pressure to the low absolute pressure, the respiratory management module is to determine a respiratory quotient with respect to the perishable commodity in the low pressure chamber, is to reduce the total absolute pressure in the low pressure chamber until the respiratory quotient with respect to the perishable commodity in the low pressure chamber indicates the anaerobic compensation point for the perishable commodity, and is to set the low absolute pressure, wherein the low absolute pressure is above the anaerobic compensation point for the perishable commodity.

Example 3. The apparatus according to Example 1, wherein the respiratory management module is further to establish a baseline respiration of the perishable commodity in the low pressure chamber at the low absolute pressure.

Example 4. The apparatus according to Example 3, wherein the baseline respiration comprises a minimum oxygen consumption by the perishable commodity in the low pressure chamber at the low absolute pressure.

Example 5. The apparatus according to Example 3, wherein the respiratory management module is to control the gas composition in the low pressure chamber to reduce aerobic respiration of the perishable commodity and avoid anaerobic respiration of the perishable commodity in response to the respiration of the perishable commodity in the low pressure chamber relative to the baseline respiration of the perishable commodity in the low pressure chamber.

Example 6. The apparatus according to Example 1, wherein the respiratory management module is to determine the respiration of the perishable commodity in the low pressure chamber based on at least one of a rate of production of carbon dioxide or a rate of consumption of oxygen by the perishable commodity in the low pressure chamber, wherein the respiratory management module is to determine the rate of production of carbon dioxide based on the carbon dioxide partial pressure in the low pressure chamber over time and is to determine the rate of consumption of oxygen based on the oxygen partial pressure in the low pressure chamber over time.

Example 7. The apparatus according to Example 1, wherein to reduce aerobic respiration of the perishable commodity and avoid anaerobic respiration of the perishable commodity, the respiratory management module is to detect at least one of an increase in a temperature of the perishable commodity in the low pressure chamber, an increase in the respiration of the perishable commodity in the low pressure, or a respiratory quotient of the perishable commodity in the low pressure chamber greater than a respiratory quotient threshold.

Example 8. The apparatus according to Example 7, wherein the respiratory quotient threshold is determined relative to an anaerobic compensation point for the perishable commodity.

Example 9. The apparatus according to Example 7, wherein the respiratory quotient threshold is greater than 0.7:1.

Example 10. The apparatus according to Example 7, wherein the respiratory quotient threshold is greater than 1.3:1.

Example 11. The apparatus according to Example 7, wherein in response to detecting at least one of the increase in the temperature of the perishable commodity in the low pressure chamber, the increase in the respiration of the perishable commodity in the low pressure, or the respiratory quotient of the perishable commodity in the low pressure chamber greater than the respiratory quotient threshold, the respiratory management module is to increase a top of an oxygen partial pressure band.

Example 12. The apparatus according to Example 11, wherein the respiratory management module is further to increase a top of a carbon dioxide partial pressure band.

Example 13. The apparatus according to Example 12, wherein to increase the top of the oxygen partial pressure band and the carbon dioxide partial pressure band, the respiratory management module is to introduce an oxygen containing gas and increase the low absolute pressure.

Example 14. The apparatus according to Example 13, wherein to increase the low absolute pressure comprises to increase a floor and a ceiling of a low absolute pressure band and wherein to introduce the oxygen containing gas and increase the low absolute pressure comprises to not reduce the low absolute pressure below the floor of the low absolute pressure band.

Example 15. The apparatus according to Example 1, wherein the respiratory management module is to maintain at least one of the carbon dioxide partial pressure within a carbon dioxide band or the oxygen partial pressure within an oxygen band in the low pressure chamber until the respiratory management module detects at least one of an increase in a temperature of the perishable commodity in the low pressure chamber, an increase in the respiration of the perishable commodity in the low pressure, or a respiratory quotient of the perishable commodity in the low pressure chamber greater than a respiratory quotient threshold.

Example 16. The apparatus according to Example 1, wherein the respiratory management module is to determine that a respiratory quotient of the perishable commodity in the low pressure chamber is less than a respiratory quotient threshold for the perishable commodity and, in response thereto, is to decrease the low absolute pressure.

Example 17. A method to reduce respiration of a perishable commodity in a low pressure chamber, comprising: with a gas measurement and management system and the low pressure chamber: obtaining a total absolute pressure in the low pressure chamber; obtaining at least one of a carbon dioxide partial pressure in the low pressure chamber or an oxygen partial pressure in the low pressure chamber; reducing the total absolute pressure to a low absolute pressure, wherein the low absolute pressure is above an anaerobic compensation point for the perishable commodity; determining a respiration of the perishable commodity in the low pressure chamber at the low absolute pressure; and in response to the respiration of the perishable commodity in the low pressure chamber, controlling a gas composition and the low absolute pressure in the low pressure chamber to reduce aerobic respiration of the perishable commodity and avoid anaerobic respiration of the perishable commodity in the low pressure chamber.

Example 18. The method according to Example 18, wherein reducing the total absolute pressure to the low absolute pressure comprises determining a respiratory quotient with respect to the perishable commodity in the low pressure chamber, reducing the total absolute pressure in the low pressure chamber until the respiratory quotient with respect to the perishable commodity in the low pressure chamber indicates the anaerobic compensation point for the perishable commodity, and setting the low absolute pressure, wherein the low absolute pressure is above the anaerobic compensation point for the perishable commodity.

Example 19. The method according to Example 18, further comprising establishing a baseline respiration of the perishable commodity in the low pressure chamber at the low absolute pressure.

Example 20. The method according to Example 20, wherein the baseline respiration comprises a minimum oxygen consumption by the perishable commodity in the low pressure chamber at the low absolute pressure.

Example 21. The method according to Example 20, wherein controlling the gas composition in the low pressure chamber and the low absolute pressure in the low pressure chamber to reduce aerobic respiration of the perishable commodity and avoid anaerobic respiration of the perishable commodity comprises controlling the gas composition in the low pressure chamber in response to the respiration of the perishable commodity in the low pressure chamber relative to the baseline respiration of the perishable commodity in the low pressure chamber.

Example 22. The method according to Example 18, further comprising determining the respiration of the perishable commodity in the low pressure chamber based on at least one of a rate of production of carbon dioxide or a rate of consumption of oxygen by the perishable commodity in the low pressure chamber, and further comprising determining the rate of production of carbon dioxide based on the carbon dioxide partial pressure in the low pressure chamber over time and determining the rate of consumption of oxygen based on the oxygen partial pressure in the low pressure chamber over time.

Example 23. The method according to Example 18, wherein reducing aerobic respiration of the perishable commodity to avoid anaerobic respiration of the perishable commodity further comprises detecting at least one of an increase in a temperature of the perishable commodity in the low pressure chamber, an increase in the respiration of the perishable commodity in the low pressure, or a respiratory quotient of the perishable commodity in the low pressure chamber greater than a respiratory quotient threshold.

Example 24. The method according to Example 24, wherein the respiratory quotient threshold is determined relative to an anaerobic compensation point for the perishable commodity.

Example 25. The method according to Example 24, wherein the respiratory quotient threshold is greater than 0.7:1.

Example 26. The method according to Example 24, wherein the respiratory quotient threshold is greater than 1.3:1.

Example 27. The method according to Example 24, wherein in response to detecting at least one of the increase in the temperature of the perishable commodity in the low pressure chamber, the increase in the respiration of the perishable commodity in the low pressure, or the respiratory quotient of the perishable commodity in the low pressure chamber greater than the respiratory quotient threshold, further comprising increasing a top of an oxygen partial pressure band.

Example 28. The method according to Example 28, further comprising increasing a top of a carbon dioxide partial pressure band.

Example 29. The method according to Example 29, wherein increasing the top of the oxygen partial pressure band and the carbon dioxide partial pressure band comprises introducing an oxygen containing gas and increasing the low absolute pressure.

Example 30. The method according to Example 30, wherein increasing the low absolute pressure comprises increasing a floor and a ceiling of a low absolute pressure band and wherein introducing the oxygen containing gas and increasing the low absolute pressure comprises to not reduce the low absolute pressure below the floor of the low absolute pressure band.

Example 31. The method according to Example 18, further comprising maintaining at least one of the carbon dioxide partial pressure within a carbon dioxide band or the oxygen partial pressure within an oxygen band in the low pressure chamber until detecting at least one of an increase in a temperature of the perishable commodity in the low pressure chamber, an increase in the respiration of the perishable commodity in the low pressure, or a respiratory quotient of the perishable commodity in the low pressure chamber greater than a respiratory quotient threshold.

Example 32. The method according to Example 18, further comprising determining that a respiratory quotient of the perishable commodity in the low pressure chamber is less than a respiratory quotient threshold for the perishable commodity and, in response thereto, decreasing the low absolute pressure.

Example 33. An apparatus to reduce respiration of a perishable commodity in a low pressure chamber, comprising: a gas measurement and management system and the low pressure chamber: means to obtain a total absolute pressure in the low pressure chamber; means to obtain at least one of a carbon dioxide partial pressure in the low pressure chamber or an oxygen partial pressure in the low pressure chamber; means to reduce the total absolute pressure to a low absolute pressure, wherein the low absolute pressure is above an anaerobic compensation point for the perishable commodity; means to determine a respiration of the perishable commodity in the low pressure chamber at the low absolute pressure; and in response to the respiration of the perishable commodity in the low pressure chamber, means to control a gas composition and the low absolute pressure in the low pressure chamber to reduce aerobic respiration of the perishable commodity and avoid anaerobic respiration of the perishable commodity in the low pressure chamber.

Example 34. The apparatus according to Example 35, wherein means to reduce the total absolute pressure to the low absolute pressure comprises means to determine a respiratory quotient with respect to the perishable commodity in the low pressure chamber, reduce the total absolute pressure in the low pressure chamber until the respiratory quotient with respect to the perishable commodity in the low pressure chamber indicates the anaerobic compensation point for the perishable commodity, and set the low absolute pressure, wherein the low absolute pressure is above the anaerobic compensation point for the perishable commodity.

Example 35. The apparatus according to Example 35, further comprising means to establish a baseline respiration of the perishable commodity in the low pressure chamber at the low absolute pressure.

Example 36. The apparatus according to Example 37, wherein the baseline respiration comprises a minimum oxygen consumption by the perishable commodity in the low pressure chamber at the low absolute pressure.

Example 37. The apparatus according to Example 37, wherein means to control the gas composition in the low pressure chamber and the low absolute pressure in the low pressure chamber to reduce aerobic respiration of the perishable commodity and avoid anaerobic respiration of the perishable commodity comprises means to control the gas composition in the low pressure chamber in response to the respiration of the perishable commodity in the low pressure chamber relative to the baseline respiration of the perishable commodity in the low pressure chamber.

Example 38. The apparatus according to Example 35, further comprising means to determine the respiration of the perishable commodity in the low pressure chamber based on at least one of a rate of production of carbon dioxide or a rate of consumption of oxygen by the perishable commodity in the low pressure chamber, and further comprising means to determine the rate of production of carbon dioxide based on the carbon dioxide partial pressure in the low pressure chamber over time and means to determine the rate of consumption of oxygen based on the oxygen partial pressure in the low pressure chamber over time.

Example 39. The apparatus according to Example 35, wherein means to reduce aerobic respiration of the perishable commodity to avoid anaerobic respiration of the perishable commodity further comprises means to detect at least one of an increase in a temperature of the perishable commodity in the low pressure chamber, an increase in the respiration of the perishable commodity in the low pressure, or a respiratory quotient of the perishable commodity in the low pressure chamber greater than a respiratory quotient threshold.

Example 40. The apparatus according to Example 41, further comprising means to determine the respiratory quotient threshold relative to an anaerobic compensation point for the perishable commodity.

Example 41. The apparatus according to Example 41, wherein the respiratory quotient threshold is greater than 0.7:1.

Example 42. The apparatus according to Example 41, wherein the respiratory quotient threshold is greater than 1.3:1.

Example 43. The apparatus according to Example 41, further comprising means to increase a top of an oxygen partial pressure band in response to detecting at least one of the increase in the temperature of the perishable commodity in the low pressure chamber, the increase in the respiration of the perishable commodity in the low pressure, or the respiratory quotient of the perishable commodity in the low pressure chamber greater than the respiratory quotient threshold.

Example 44. The apparatus according to Example 45, further comprising means to increase a top of a carbon dioxide partial pressure band.

Example 45. The apparatus according to Example 46, wherein means to increase the top of the oxygen partial pressure band and the carbon dioxide partial pressure band comprises means to introduce an oxygen containing gas and means to increase the low absolute pressure.

Example 46. The apparatus according to Example 47, wherein means to increase the low absolute pressure comprises means to increase a floor and a ceiling of a low absolute pressure band and wherein means to introduce the oxygen containing gas and means to increase the low absolute pressure comprises means to not reduce the low absolute pressure below the floor of the low absolute pressure band.

Example 47. The apparatus according to Example 35, further comprising means to maintain at least one of the carbon dioxide partial pressure within a carbon dioxide band or the oxygen partial pressure within an oxygen band in the low pressure chamber until detection of at least one of an increase in a temperature of the perishable commodity in the low pressure chamber, an increase in the respiration of the perishable commodity in the low pressure, or a respiratory quotient of the perishable commodity in the low pressure chamber greater than a respiratory quotient threshold.

Example 48. The apparatus according to Example 35, further comprising means to determine that a respiratory quotient of the perishable commodity in the low pressure chamber is less than a respiratory quotient threshold for the perishable commodity and, in response thereto, means to decrease the low absolute pressure.

Example 49. One or more computer-readable media comprising instructions that cause a computer device, in response to execution of the instructions by a processor of the computer device, to: obtain a total absolute pressure from a gas measurement and management system with respect to a low pressure chamber; obtain at least one of a carbon dioxide partial pressure in the low pressure chamber or an oxygen partial pressure in the low pressure chamber; reduce the total absolute pressure to a low absolute pressure, wherein the low absolute pressure is above an anaerobic compensation point for the perishable commodity; determine a respiration of the perishable commodity in the low pressure chamber at the low absolute pressure; and in response to the respiration of the perishable commodity in the low pressure chamber, to control a gas composition and the low absolute pressure in the low pressure chamber to reduce aerobic respiration of the perishable commodity and avoid anaerobic respiration of the perishable commodity in the low pressure chamber.

Example 50. The computer-readable media according to Example 52, wherein to reduce the total absolute pressure to the low absolute pressure comprises to determine a respiratory quotient with respect to the perishable commodity in the low pressure chamber, reduce the total absolute pressure in the low pressure chamber until the respiratory quotient with respect to the perishable commodity in the low pressure chamber indicates the anaerobic compensation point for the perishable commodity, and set the low absolute pressure, wherein the low absolute pressure is above the anaerobic compensation point for the perishable commodity.

Example 51. The computer-readable media according to Example 52, wherein the instructions further cause the computer device to establish a baseline respiration of the perishable commodity in the low pressure chamber at the low absolute pressure.

Example 52. The computer-readable media according to Example 54, wherein the baseline respiration comprises a minimum oxygen consumption by the perishable commodity in the low pressure chamber at the low absolute pressure.

Example 53. The computer-readable media according to Example 54, wherein to control the gas composition in the low pressure chamber and the low absolute pressure in the low pressure chamber to reduce aerobic respiration of the perishable commodity and avoid anaerobic respiration of the perishable commodity comprises to control the gas composition in the low pressure chamber in response to the respiration of the perishable commodity in the low pressure chamber relative to the baseline respiration of the perishable commodity in the low pressure chamber.

Example 54. The computer-readable media according to Example 52, wherein the instructions further cause the computer device to determine the respiration of the perishable commodity in the low pressure chamber based on at least one of a rate of production of carbon dioxide or a rate of consumption of oxygen by the perishable commodity in the low pressure chamber, and further cause the computer device to determine the rate of production of carbon dioxide based on the carbon dioxide partial pressure in the low pressure chamber over time and to determine the rate of consumption of oxygen based on the oxygen partial pressure in the low pressure chamber over time.

Example 55. The computer-readable media according to Example 52, wherein to reduce aerobic respiration of the perishable commodity to avoid anaerobic respiration of the perishable commodity the instructions further cause the computer device to detect at least one of an increase in a temperature of the perishable commodity in the low pressure chamber, an increase in the respiration of the perishable commodity in the low pressure, or a respiratory quotient of the perishable commodity in the low pressure chamber greater than a respiratory quotient threshold.

Example 56. The computer-readable media according to Example 58, wherein the instructions further cause the computer device to determine the respiratory quotient threshold relative to an anaerobic compensation point for the perishable commodity.

Example 57. The computer-readable media according to Example 58, wherein the respiratory quotient threshold is greater than 0.7:1.

Example 58. The computer-readable media according to Example 58, wherein the respiratory quotient threshold is greater than 1.3:1.

Example 59. The computer-readable media according to Example 58, wherein the instructions further cause the computer device to increase a top of an oxygen partial pressure band in response to detecting at least one of the increase in the temperature of the perishable commodity in the low pressure chamber, the increase in the respiration of the perishable commodity in the low pressure, or the respiratory quotient of the perishable commodity in the low pressure chamber greater than the respiratory quotient threshold.

Example 60. The computer-readable media according to Example 62, wherein the instructions further cause the computer device to increase a top of a carbon dioxide partial pressure band.

Example 61. The computer-readable media according to Example 63, wherein to increase the top of the oxygen partial pressure band and the carbon dioxide partial pressure band, the instructions further cause the computer device to introduce an oxygen containing gas and to increase the low absolute pressure.

Example 62. The computer-readable media according to Example 64, wherein to increase the low absolute pressure comprises to increase a floor and a ceiling of a low absolute pressure band and wherein to introduce the oxygen containing gas and to increase the low absolute pressure, the instructions further cause the computer device to not reduce the low absolute pressure below the floor of the low absolute pressure band.

Example 63. The computer-readable media according to Example 52, wherein the instructions further cause the computer device to maintain at least one of the carbon dioxide partial pressure within a carbon dioxide band or the oxygen partial pressure within an oxygen band in the low pressure chamber until detection of at least one of an increase in a temperature of the perishable commodity in the low pressure chamber, an increase in the respiration of the perishable commodity in the low pressure, or a respiratory quotient of the perishable commodity in the low pressure chamber greater than a respiratory quotient threshold.

Example 64. The computer-readable media according to Example 52, wherein the instructions further cause the computer device to determine that a respiratory quotient of the perishable commodity in the low pressure chamber is less than a respiratory quotient threshold for the perishable commodity and, in response thereto, to decrease the low absolute pressure.

The invention claimed is:

1. An apparatus to reduce respiration of a perishable commodity in a low pressure chamber, comprising:
   the low pressure chamber, a gas measurement and management system, a computer processor and a memory, and a respiratory management module in the memory to manage respiration of the perishable commodity in the low pressure chamber; wherein
   to manage respiration of the perishable commodity in the low pressure chamber, the processor is to execute the respiratory management module and the respiratory management module is to use the gas measurement and management system and the low pressure chamber to:
   obtain a total absolute pressure in the low pressure chamber, obtain at least one of a carbon dioxide partial pressure in the low pressure chamber or an oxygen partial pressure in the low pressure chamber;
   reduce the total absolute pressure to a low absolute pressure, wherein the low absolute pressure is above an anaerobic compensation point for the perishable commodity;
   determine a respiration of the perishable commodity in the low pressure chamber at the low absolute pressure; and
   in response to the respiration of the perishable commodity in the low pressure chamber, control a gas composition and the low absolute pressure in the low pressure chamber to reduce aerobic respiration of the perishable commodity and avoid anaerobic respiration of the perishable commodity in the low pressure chamber.

2. The apparatus according to 1, wherein to reduce the total absolute pressure to the low absolute pressure, the respiratory management module is to determine a respiratory quotient with respect to the perishable commodity in the low pressure chamber, is to reduce the total absolute pressure in the low pressure chamber until the respiratory quotient with respect to the perishable commodity in the low pressure chamber indicates the anaerobic compensation point for the perishable commodity, and is to set the low absolute pressure, wherein the low absolute pressure is above the anaerobic compensation point for the perishable commodity.

3. The apparatus according to 1, wherein the respiratory management module is further to establish a baseline respiration of the perishable commodity in the low pressure chamber at the low absolute pressure.

4. The apparatus according to 3, wherein the respiratory management module is to control the gas composition in the low pressure chamber to reduce aerobic respiration of the perishable commodity and avoid anaerobic respiration of the perishable commodity in response to the respiration of the perishable commodity in the low pressure chamber relative to the baseline respiration of the perishable commodity in the low pressure chamber.

5. The apparatus according to 1, wherein to reduce aerobic respiration of the perishable commodity and avoid anaerobic respiration of the perishable commodity, the respiratory management module is to detect at least one of an increase in a temperature of the perishable commodity in the low pressure chamber, an increase in the respiration of the perishable commodity in the low pressure, or a respiratory quotient of the perishable commodity in the low pressure chamber greater than a respiratory quotient threshold.

6. The apparatus according to 5, wherein in response to detecting at least one of the increase in the temperature of the perishable commodity in the low pressure chamber, the increase in the respiration of the perishable commodity in the low pressure, or the respiratory quotient of the perishable commodity in the low pressure chamber greater than the respiratory quotient threshold, the respiratory management module is to increase at least one of a top of an oxygen partial pressure band or a top of a carbon dioxide partial pressure band.

7. The apparatus according to 6, wherein to increase the top of the oxygen partial pressure band or the carbon dioxide partial pressure band, the respiratory management module is to introduce an oxygen containing gas and increase the low absolute pressure.

8. The apparatus according to 1, wherein the respiratory management module is to determine that a respiratory quotient of the perishable commodity in the low pressure chamber is less than a respiratory quotient threshold for the perishable commodity and, in response thereto, is to decrease the low absolute pressure.

9. A method to reduce respiration of a perishable commodity in a low pressure chamber, comprising:
 with a gas measurement and management system and the low pressure chamber:
 obtaining a total absolute pressure in the low pressure chamber;
 obtaining at least one of a carbon dioxide partial pressure in the low pressure chamber or an oxygen partial pressure in the low pressure chamber;
 reducing the total absolute pressure to a low absolute pressure, wherein the low absolute pressure is above an anaerobic compensation point for the perishable commodity;
 determining a respiration of the perishable commodity in the low pressure chamber at the low absolute pressure; and
 in response to the respiration of the perishable commodity in the low pressure chamber, controlling a gas composition and the low absolute pressure in the low pressure chamber to reduce aerobic respiration of the perishable commodity and avoid anaerobic respiration of the perishable commodity in the low pressure chamber.

10. The method according to 9, wherein reducing the total absolute pressure to the low absolute pressure comprises determining a respiratory quotient with respect to the perishable commodity in the low pressure chamber, reducing the total absolute pressure in the low pressure chamber until the respiratory quotient with respect to the perishable commodity in the low pressure chamber indicates the anaerobic compensation point for the perishable commodity, and setting the low absolute pressure, wherein the low absolute pressure is above the anaerobic compensation point for the perishable commodity.

11. The method according to 9, further comprising establishing a baseline respiration of the perishable commodity in the low pressure chamber at the low absolute pressure.

12. The method according to 11, wherein controlling the gas composition in the low pressure chamber and the low absolute pressure in the low pressure chamber to reduce aerobic respiration of the perishable commodity and avoid anaerobic respiration of the perishable commodity comprises controlling the gas composition in the low pressure chamber in response to the respiration of the perishable commodity in the low pressure chamber relative to the baseline respiration of the perishable commodity in the low pressure chamber.

13. The method according to 9, wherein reducing aerobic respiration of the perishable commodity to avoid anaerobic respiration of the perishable commodity further comprises detecting at least one of an increase in a temperature of the perishable commodity in the low pressure chamber, an increase in the respiration of the perishable commodity in the low pressure, or a respiratory quotient of the perishable commodity in the low pressure chamber greater than a respiratory quotient threshold.

14. The method according to 13, wherein in response to detecting at least one of the increase in the temperature of the perishable commodity in the low pressure chamber, the increase in the respiration of the perishable commodity in the low pressure, or the respiratory quotient of the perishable commodity in the low pressure chamber greater than the respiratory quotient threshold, further comprising increasing a top of an oxygen partial pressure band or a top of a carbon dioxide partial pressure band.

15. The method according to 14, wherein increasing the top of the oxygen partial pressure band and the carbon dioxide partial pressure band comprises introducing an oxygen containing gas and increasing the low absolute pressure.

16. One or more computer-readable media comprising instructions that cause a computer device, in response to execution of the instructions by a processor of the computer device, to:
 obtain a total absolute pressure from a gas measurement and management system with respect to a low pressure chamber;
 obtain at least one of a carbon dioxide partial pressure in the low pressure chamber or an oxygen partial pressure in the low pressure chamber;
 reduce the total absolute pressure to a low absolute pressure, wherein the low absolute pressure is above an anaerobic compensation point for the perishable commodity;

determine a respiration of the perishable commodity in the low pressure chamber at the low absolute pressure; and in response to the respiration of the perishable commodity in the low pressure chamber, to control a gas composition and the low absolute pressure in the low pressure chamber to reduce aerobic respiration of the perishable commodity and avoid anaerobic respiration of the perishable commodity in the low pressure chamber.

17. The computer-readable media according to 16, wherein to reduce the total absolute pressure to the low absolute pressure comprises to determine a respiratory quotient with respect to the perishable commodity in the low pressure chamber, reduce the total absolute pressure in the low pressure chamber until the respiratory quotient with respect to the perishable commodity in the low pressure chamber indicates the anaerobic compensation point for the perishable commodity, and set the low absolute pressure, wherein the low absolute pressure is above the anaerobic compensation point for the perishable commodity.

18. The computer-readable media according to 16, wherein the instructions further cause the computer device to establish a baseline respiration of the perishable commodity in the low pressure chamber at the low absolute pressure.

19. The computer-readable media according to 18, wherein to control the gas composition in the low pressure chamber and the low absolute pressure in the low pressure chamber to reduce aerobic respiration of the perishable commodity and avoid anaerobic respiration of the perishable commodity comprises to control the gas composition in the low pressure chamber in response to the respiration of the perishable commodity in the low pressure chamber relative to the baseline respiration of the perishable commodity in the low pressure chamber.

20. The computer-readable media according to 16, wherein to reduce aerobic respiration of the perishable commodity to avoid anaerobic respiration of the perishable commodity the instructions further cause the computer device to detect at least one of an increase in a temperature of the perishable commodity in the low pressure chamber, an increase in the respiration of the perishable commodity in the low pressure, or a respiratory quotient of the perishable commodity in the low pressure chamber greater than a respiratory quotient threshold.

* * * * *